(12) United States Patent
Zepeniuk et al.

(10) Patent No.: US 10,055,027 B2
(45) Date of Patent: Aug. 21, 2018

(54) MULTIPLE MODAL PROCESSING SYSTEM AND METHOD FOR NATURAL USER INTERFACE APPLICATIONS

(71) Applicant: INUITIVE LTD., Ra'anana (IL)

(72) Inventors: Dor Zepeniuk, Kfar Hess (IL); Shlomo Gadot, Hertzliya (IL); Ziv Tsoref, Tel Aviv (IL)

(73) Assignee: INUITIVE LTD, Ra'anana (IL)

( * ) Notice: Subject to any disclaimer, the term of this patent is extended or adjusted under 35 U.S.C. 154(b) by 101 days.

(21) Appl. No.: 15/116,243

(22) PCT Filed: Feb. 5, 2015

(86) PCT No.: PCT/IL2015/050134
§ 371 (c)(1),
(2) Date: Aug. 3, 2016

(87) PCT Pub. No.: WO2015/118539
PCT Pub. Date: Aug. 13, 2015

(65) Prior Publication Data
US 2017/0010686 A1    Jan. 12, 2017

Related U.S. Application Data

(60) Provisional application No. 61/935,870, filed on Feb. 5, 2014.

(51) Int. Cl.
*G06F 3/03*    (2006.01)
*G06F 3/01*    (2006.01)

(52) U.S. Cl.
CPC ............ *G06F 3/0304* (2013.01); *G06F 3/011* (2013.01); *G06F 3/012* (2013.01); *G06F 3/013* (2013.01);
(Continued)

(58) Field of Classification Search
CPC .......... G06F 3/012; G06F 3/013; G06F 3/017; G06F 3/0304; G06F 2203/0381; G06F 3/01; G06F 3/011
See application file for complete search history.

(56) References Cited

U.S. PATENT DOCUMENTS

2003/0016128 A1    1/2003 Lutz et al.
2004/0117513 A1    6/2004 Scott
(Continued)

FOREIGN PATENT DOCUMENTS

WO    WO 2014/003796    1/2014

OTHER PUBLICATIONS

International Search Report of PCT Application No. PCT/IL2015/050134 dated May 20, 2015.
(Continued)

*Primary Examiner* — Dmitriy Bolotin
(74) *Attorney, Agent, or Firm* — Pearl Cohen Zedek Latzer Baratz LLP

(57) ABSTRACT

A natural user interface (NUI) computer processor is provided herein. The NUI computer processor may include: at least one computer processing module; and a plurality of sensors, connected with direct, high bandwidth connectors to the at least one computer processing module, wherein the computer processing module is configured to support a full extent of processing power required for simultaneous multimodal high resolution information handling gathered by said sensors, wherein the computer processing module and the high bandwidth connectors are cooperatively configured to eliminate any non-vital delays, to reduce latency between human user actions captured by said sensors and response by the NUI computer processor.

14 Claims, 2 Drawing Sheets

(52) U.S. Cl.
CPC ...... *G06F 3/017* (2013.01); *G06F 2203/0381* (2013.01)

(56) References Cited

U.S. PATENT DOCUMENTS

| | | | |
|---|---|---|---|
| 2005/0132378 A1 | 6/2005 | Horvitz et al. | |
| 2010/0271302 A1 | 10/2010 | Pering et al. | |
| 2012/0215531 A1 | 8/2012 | Grobauer et al. | |
| 2014/0152777 A1* | 6/2014 | Galor .................. | H04N 5/2254 348/47 |

OTHER PUBLICATIONS

Zhao et al., "Distributed Sensor Data Processing for Many Cores", In Proceedings of the Great Lakes Symposium on VLSI, pp. 159-164, ACM, May 31, 2012.

Ming, L. et al., "DP-Fusion: A Generic Framework of Online Multi Sensor Recognition", Proc. of the IEEE International Conference on Multisensor Fusion and Information Integration (MFI) 2012, Dec. 31, 2012.

Borkar et al., "Decentralized State Initialization with Delay Compensation for Multi-Model Sensor Networks", The Journal of VLSI Signal Processing System for Signal, Image and Video Technology, vol. 48(1-2), pp. 109-125, Dec. 31, 2007.

Kaempchen, N. et al., "Data Synchronization Strategies for Multi-Sensor Fusion", In Proceedings of the IEEE Conference on Intelligent Transportation Systems, pp. 1-9, Oct. 31, 2003.

Guillermo Pérez et al; Two strategies for multimodal fusion; Proceedings of ICMI'05 Workshop on Multimodal Interaction for the Visualisation and Exploration of Scientific Data. Trento, Italy. Oct. 2005.

Alejandro Jaimes and Nicu Sebe; Multimodal Human Computer Interaction: A Survey; IEEE International Workshop on Human Computer Interaction in conjunction with ICCV 2005, Beijing, China, Oct. 21, 2005.

Cees G.M. Snoek et al; Early versus Late Fusion in Semantic Video Analysis;MM'05, Nov. 6.11, 2005, Singapore Conference Paper • Jan. 2005.

Zhihong Zeng et al; A Survey of Affect Recognition Methods: Audio, Visual, and Spontaneous Expressions; IEEE Transactions on Pattern Analysis and Machine Intelligence, vol. 31, No. 1, Jan. 2009.

* cited by examiner

100

MULTIPLE MODAL PROCESSING SYSTEM AND METHOD FOR NATURAL USER INTERFACE APPLICATIONS

CROSS-REFERENCE TO RELATED APPLICATIONS

This application is a National Phase Application of PCT International Application No. PCT/IL2015/050134, International Filing Date Feb. 5, 2015, claiming priority of U.S. Patent Application No. 61/935,870, filed Feb. 5, 2014, which is hereby incorporated by reference.

TECHNICAL FIELD

The present invention relates generally to the field of signal processing, and more particularly, to signal processing systems that process signals from a plurality of sensors for user interface purposes.

BACKGROUND OF THE INVENTION

Natural user interface (NUI) has become very popular in recent years with the introduction of true experience computer games and sophisticated consumer electronic goods. NUIs extend user experience beyond touch displays, as the latter require actual contact with the display and do not distinguish contacts by different users.

Natural user interface (NUI) has become very popular in recent years with the introduction of true experience computer games and sophisticated consumer electronic goods. Most NUI-based products provide some or all of the following NUI functionalities, also termed modalities: gesture recognition, gaze detection, face recognition, expression recognition, speaker recognition, speech recognition, and depth map generation. Some of the current NUI solutions are also based on the generation of a depth map of the scene which is later enhanced with optical/visible light data of the scene.

In order to provide a robust and accurate NUI system all the separate input sources should be processed simultaneously and mutual dependencies should be considered. As an example, a certain movement of the hand may be interpreted as a specific gesture played by the user as part of his system activation when the user looks at the system, and exactly the same gesture should be interpreted as an unintentional gesture when the user is looking away from the system.

In the professional literature, the task of jointly processing multiple input sources into a comprehensive well defined result is termed Multimodal-fusion. The different methods of multimodal fusion generally falls into one of three possible categories: Early-fusion, Late-fusion and Intermediate-fusion ("Early versus Late Fusion in Semantic Video Analysis", Cees G. M. Snoek, 2005; "Two strategies for multimodal fusion", Guillermo Perez, 2005).

In early-fusion one takes the raw data immediately at capture time from the separate sources create a unified input vector and uses the whole information in the decision process. This makes sure all the dependencies between the modalities are not lost and gives higher probability for correct decision or classification. On the other hand, this requires simultaneous processing of very large amount of information.

In late-fusion one processes each source (modality) separately to high semantic level (recognize the spoken word, the hand-gesture, etc.) and then uses the separate modal decision to make a joint decision of the user status or intention. In this case the joint decision uses very small amount of information and can be processed easily, however, practically all the subtle dependencies between the sources has been lost. Another major drawback of the late fusion is the time-alignment problem. The separate information sources—hand gestures, spoken words, eye movements, etc. occur in some time proximity but not simultaneously and do not take the same amount of time, late fusion might therefore miss the inter-source dependencies entirely.

Intermediate-fusion tries to enjoy both worlds by performing partial fusion steps in different stages of the process.

Some of the disadvantages of the currently available NUI solutions are their failure to process efficiently the very large amount of input information from the separate modalities required for high quality results. Most current available systems use the late-fusion strategy (Jaimes and Sebe, 2005). However, neurological studies of the brain support early fusion more than late fusion in human multimodal fusion ("A Survey of Affect Recognition Methods: Audio, Visual, and Spontaneous Expressions," Z. Zeng et al., 2009.)

SUMMARY OF THE INVENTION

Embodiments of the present invention provide a natural user interface (NUI) computer processor. The NUI computer processor may include: at least one computer processing module; and a plurality of sensors, connected with direct, high bandwidth connectors to the at least one computer processing module, wherein the computer processing module is configured to support a full extent of processing power required for simultaneous multi-modal high resolution information handling gathered by said sensors, wherein the computer processing module and the high bandwidth connectors are cooperatively configured to eliminate any non-vital delays, to reduce latency between human user actions captured by said sensors and response by the NUI computer processor.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
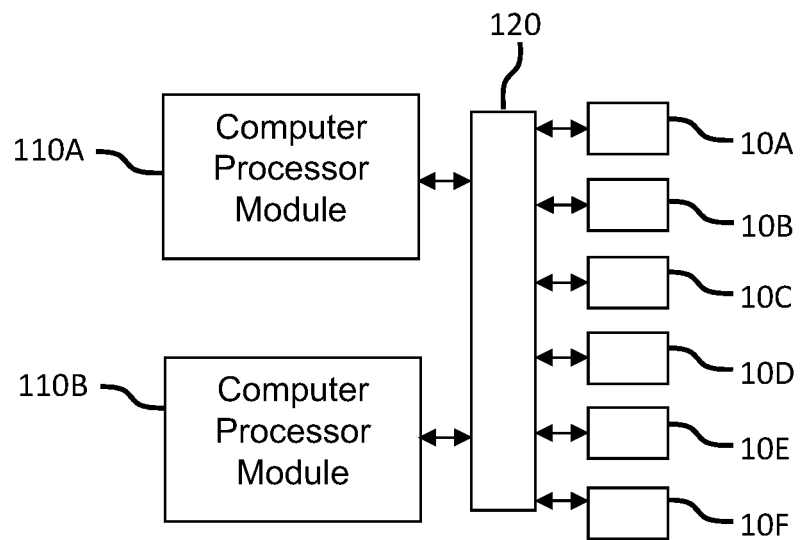
FIG. 1 is a schematic illustration of a system for in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

With specific reference now to description in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a schematic illustration of a system for in accordance with embodiments of the present invention. System 100 may include at least one computer processing module 110A and 110B and a plurality of sensors 10A-10F, connected with direct, high bandwidth connectors 120 to the at least one computer processing module 110A and 110B. In operation, the computer processing modules 110A and 110B are configured to support a full extent of processing power required for simultaneous multi-modal high resolution information handling gathered by sensors 10A-10F. Additionally, computer processing modules 110A and 110B and the high bandwidth connectors 120 are cooperatively configured to eliminate any non-vital delays, to reduce latency between human user actions captured by said sensors and response by the NUI system 100.

Figure 2:
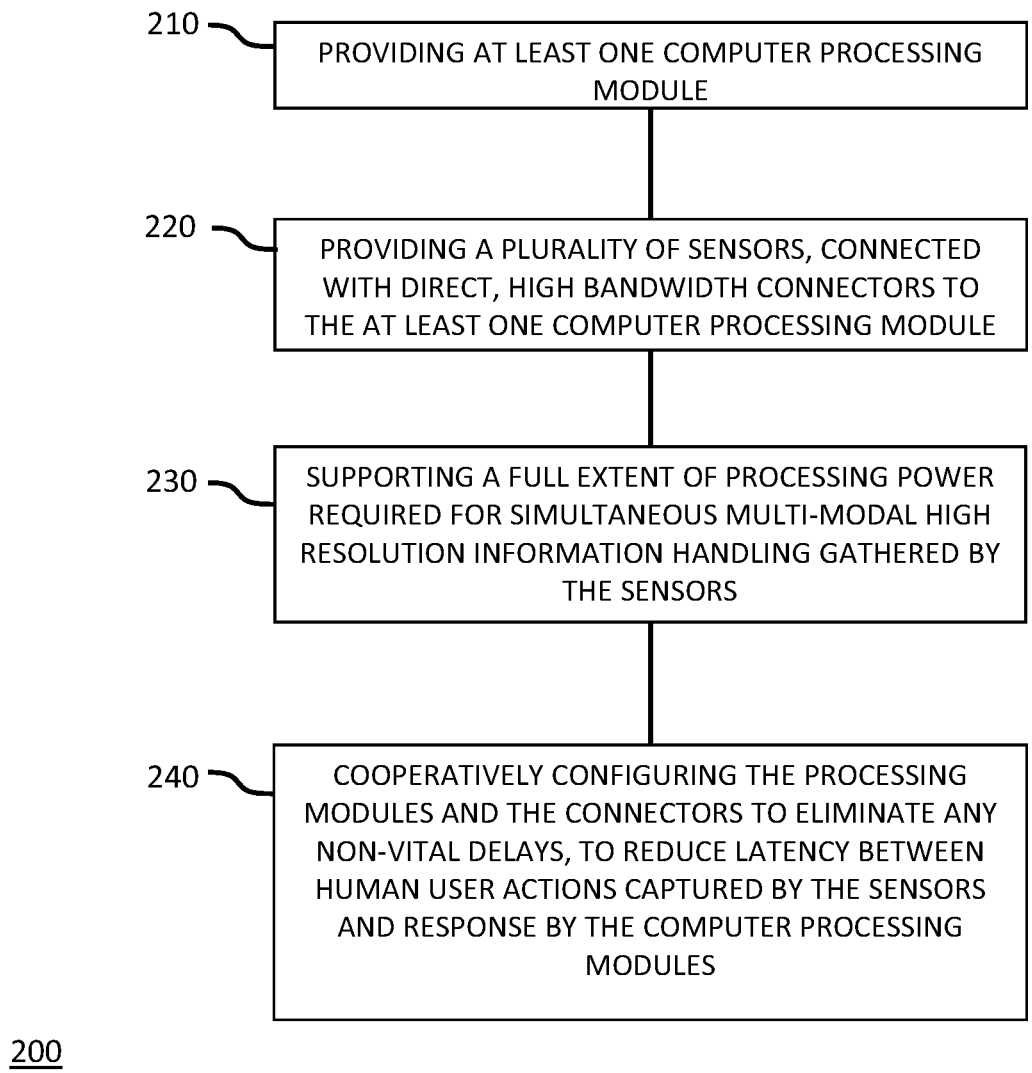
FIG. 2 is a flowchart diagram illustrating a method for in accordance with embodiments of the present invention.

FIG. 2 is a flowchart diagram illustrating a method for in accordance with embodiments of the present invention. Method 200 may include: providing at least one computer processing module 210; providing a plurality of sensors, connected with direct, high bandwidth connectors to the at least one computer processing module 220; supporting a full extent of processing power required for simultaneous multi-modal high resolution information handling gathered by said sensors 230; and cooperatively configuring the processing modules and the connectors to eliminate any non-vital delays, to reduce latency between human user actions captured by said sensors and response by the NUI system 240.

Since human capabilities to perform in multimodal environment significantly outperforms current designed computational systems, it is therefore highly desirable to develop systems that will be able to perform more early and intermediate fusion, and thus better mimic human processes.

Embodiments of the present invention are aimed directly towards this goal. The solution is addressed herein in several layers. The first layer of raw-data, deals with data acquisition from the separate sensors, synchronization and initial adjustment and tuning. The next level performs segmentation of spatial information—video, depth and audio (audio spatial information is analyzed by beamforming calculation). In this stage the separate information sources are detected—head, face and facial parts, hands, fingers and whole body. At the same time background information and scene geometry is calculated to aid in user behavior understanding.

For each information source, such as pupil (and gaze direction) head movements, facial expressions, etc., a tracking process is created to make sure the information is robustly collected continuously during the full length of the session. Naturally, if any body part or information source is lost at any time, a detection process is initiated to resume the tracking.

Finally, classifiers and decision process that combine one or more sources are performed in different times. Some run on a frame-by-frame basis, and some triggered by changes detected in one or more of the user's action (beginning or end of a hand movement, beginning or pause of speech, etc.).

To understand the way in which such early and intermediate fusion processes are enabled in the system according to embodiments of the present invention, the difficulties seen in current available systems are described herein: the first issue, in many systems is the problem to move high dimensionality data from the sensor to the processor—high frame rate video and depth information even in VGA resolution (640×480) already requires a bandwidth not available to most systems, and the common understanding today is that HD and even Full-HD resolutions are required for high accuracy processing (for example, standard Wi-fi and USB protocols do not support 1 video frame+1 depth frame @60 fps, VGA resolution). The second issue encountered by processors of multi modal information is the computational load to simultaneously deal with the full informational content. If the said processor is a general application processor, which is the case in most systems, the processor must manage context switching not only between the separate sources but also with other tasks and applications the user may activating or OS tasks required to cope with a wide range of system requirements.

The present invention, in embodiments thereof, is based on placing the NUI processor in physical proximity of the sensors, connected with direct, high bandwidth connectors. Furthermore, the architecture of the NUI processor is designed to support the full extent of processing power required for simultaneous multi-modal high resolution information handling. Special care is given to eliminate any non-vital delays to reduce latency between user action and system response. Thus, since the NUI processor is fully dedicated to the processing of the NUI information, and does not suffer from other tasks and applications competing for its resources, unprecedented capabilities are achieved, to process the separate information sources as close to their raw form as we choose, while ensuring the data is synchronized and time-aligned.

Embodiments of a system according to the present invention may include the following activities:

1. Multiple sensors sources that provide sensing data on the environmental conditions and activities that happen at the field of view of the system.
   The system may perform any one of the following actions:
   Operate the sensors—supply power and activity signals. Control the sensors—communicate with the sensor to configure it as required by the application or according to input from a different sensor. The communication may be done by I2C communication channel.
   Activate analog to digital converter to transfer the input signal to digital format Synchronize the sensors to operate simultaneously and to provide data that can be correlated
   Perform IR illumination at synchronization with the system to support the visual sensor operation. This is a first stage of data pre-fusion 2. Perform depth image and 3D special data by integrating information from multiple sensors. Depth map provided by Stereo imaging technic is an example of such process.

Integrate the whole raw data from the sensors with their depth image and the 3D special data to provide an integrated composite data. This is a second stage of data pre-fusion.

3. Perform image processing algorithms on the pre-fused data for fission the data into segments, according to the applications requirements. This segmentation may be done for specific feature extraction or for specific region of interest or update rate.

The segmentation fission is done on the pervious stage of fused data and takes advantage of correlating information that was received by different sensors. This process outcome may be a trigger for further controlling operation during the first stage or enhancing the depth information during the second stage. It should be notice that this process enhance the information rather than reduce it. This is a third stage of data pre-fusion and fission Perform further data processing algorithms to recognize activities that happen in the system FOV. The results of these processes may define the content of each of the pervious stage segment.

It should be noticed that this process comes as a characteristic layer over the segmented data and not as substitute of it. It is further possible to add quantitate values for the recognize activity such as speed or distance. Moreover, it also possible to accumulate the results and provide statistical information. The outcome of this stage may be used for performing the pervious stages. This is a fourth stage of data analysis 4. Perform synthetic interpretations of the pervious stage recognized activities. The outcome of this stage may be used for performing the pervious stages. It should be notice that such a synthetic interpretation comes as a definition layer over the characteristic layer and not as substitute of it. This is a fifth stage of data analysis.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment. Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone. Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A natural user interface (NUI) system comprising:
   at least one computer processing module; and
   a plurality of sensors, connected with direct, high bandwidth connectors to the at least one computer processing module,
   wherein the at least one computer processing module is configured to support a full extent of processing power required for simultaneous multi-modal high resolution information handling gathered by said sensors,
   wherein the at least one computer processing module and the high bandwidth connectors are cooperatively configured to eliminate any non-vital delays, to reduce latency between human user actions captured by said sensors and response by the NUI system,
   wherein the at least one computer processing module is configured to perform image processing algorithms on pre-fused data to fission the data into segments, according to the applications requirements.

2. The system according to claim 1, wherein the sensors are configured to provide sensing data on the environmental conditions and activities that happen at the field of view of the system.

3. The system according to claim 1, wherein the at least one computer processing module is configured to perform at least one of: supply power and activity signals to the sensors; control the sensors by communicating with the sensor to configure it as required by the application or according to input from a different sensor.

4. The system according to claim 1, wherein the at least one computer processing module is configured to activate an analog to digital converter to transfer the input signal to digital format.

5. The system according to claim 1, wherein the at least one computer processing module is configured to synchronize the sensors to operate simultaneously and to provide data that can be correlated.

6. The system according to claim 1, wherein the at least one computer processing module is configured to perform IR illumination at synchronization with the system to support the visual sensor operation.

7. The system according to claim 1, wherein the at least one computer processing module is configured to perform depth image and 3D special data by integrating information from multiple sensors.

8. The system according to claim 7, wherein the depth is provided by stereo imaging.

9. The system according to claim 1, wherein the at least one computer processing module is configured to integrate the whole raw data from the sensors with their depth image and the 3D special data to provide an integrated composite data.

10. The system according to claim 1, wherein the segmentation is done for specific feature extraction or for specific region of interest or update rate.

11. The system according to claim 1, wherein the segmentation fission is done on the pervious stage of fused data and takes advantage of correlating information that was received by different sensors.

12. The system according to claim 1, wherein the at least one computer processing module is configured to perform further data processing algorithms to recognize activities that happen in the system field of view (FOV).

13. The system according to claim 12, wherein the at least one computer processing module is configured to perform synthetic interpretations of the recognized activities.

14. A natural user interface (NUI) method comprising:
providing at least one computer processing module;
providing a plurality of sensors, connected with direct, high bandwidth connectors to the at least one computer processing module;
supporting a full extent of processing power required for simultaneous multi-modal high resolution information handling gathered by said sensors; and
cooperatively configuring the at least one computer processing module and the connectors to eliminate any non-vital delays, to reduce latency between human user actions captured by said sensors and response by the NUI system;
configuring the at least one processing module to perform image processing algorithm on pre-fused data for fission the data into segments, according to the applications requirements.

* * * * *